(12) United States Patent
Pachler

(10) Patent No.: US 10,685,277 B2
(45) Date of Patent: Jun. 16, 2020

(54) CHIP CARD BODY, CHIP CARD AND METHOD FOR PRODUCING A CHIP CARD BODY

(71) Applicant: Infineon Technologies AG, Neubiberg (DE)

(72) Inventor: Walther Pachler, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/226,902

(22) Filed: Dec. 20, 2018

(65) Prior Publication Data

US 2019/0197384 A1 Jun. 27, 2019

(30) Foreign Application Priority Data

Dec. 21, 2017 (DE) ........................ 10 2017 130 940

(51) Int. Cl.
| | | |
|---|---|---|
| G06K 19/077 | (2006.01) | |
| B23K 26/362 | (2014.01) | |
| B23K 26/386 | (2014.01) | |
| B23K 26/382 | (2014.01) | |
| B23K 26/40 | (2014.01) | |
| H01Q 1/22 | (2006.01) | |
| H04B 5/00 | (2006.01) | |
| B23K 103/08 | (2006.01) | |
| B23K 101/36 | (2006.01) | |
| B23K 103/12 | (2006.01) | |
| B23K 103/04 | (2006.01) | |
| B23K 101/18 | (2006.01) | |

(Continued)

(52) U.S. Cl.
CPC ...... *G06K 19/07794* (2013.01); *B23K 26/362* (2013.01); *B23K 26/382* (2015.10); *B23K 26/386* (2013.01); *B23K 26/40* (2013.01); *G06K 19/07779* (2013.01); *H01Q 1/2225* (2013.01); *H04B 5/0025* (2013.01); *H04B 5/0081* (2013.01); *B23K 2101/18* (2018.08); *B23K 2101/36* (2018.08); *B23K 2103/02* (2018.08); *B23K 2103/04* (2018.08); *B23K 2103/08* (2018.08); *B23K 2103/10* (2018.08); *B23K 2103/12* (2018.08); *B32B 2425/00* (2013.01)

(58) Field of Classification Search
CPC ....... G06K 19/07794; G06K 19/07779; H04B 5/0025; H04B 5/0081
USPC .................................................. 235/487, 492
See application file for complete search history.

(56) References Cited

U.S. PATENT DOCUMENTS 9,390,366 B1 * 7/2016 Herslow .......... G06K 19/07769
10,140,569 B2 * 11/2018 Kim ................. G06K 19/07722
(Continued)

FOREIGN PATENT DOCUMENTS

DE      102016107982 A1     11/2017

OTHER PUBLICATIONS

German Patent Office, Office Action issued for DE 102017130940.3, 5 pgs., dated Nov. 29, 2018.

*Primary Examiner* — Paultep Savusdiphol
(74) *Attorney, Agent, or Firm* — Schiff Hardin LLP

(57) ABSTRACT

A chip card body including a metal plate, a reception region in the metal plate for receiving a chip and configured for inductive coupling of the metal plate to a chip received in the reception region; and at least one through-opening in the metal plate and configured such that at least a part of the metal plate acts as an antenna for delivering an electromagnetic signal to the reception region.

18 Claims, 13 Drawing Sheets

(51) Int. Cl.
   *B23K 103/10*   (2006.01)
   *B23K 103/02*   (2006.01)

(56) References Cited

U.S. PATENT DOCUMENTS

| | | | |
|---|---|---|---|
| 10,193,211 B2 * | 1/2019 | Finn | H01Q 1/2225 |
| 2005/0052326 A1 * | 3/2005 | Gundlach | C23C 2/02 |
| | | | 343/733 |
| 2012/0325914 A1 | 12/2012 | Herslow | |
| 2013/0126622 A1 | 5/2013 | Finn | |
| 2014/0224881 A1 * | 8/2014 | Herslow | G06K 19/02 |
| | | | 235/488 |
| 2015/0206047 A1 * | 7/2015 | Herslow | G06K 19/07779 |
| | | | 235/492 |
| 2017/0017871 A1 * | 1/2017 | Finn | G06K 19/07722 |
| 2017/0308785 A1 * | 10/2017 | Kim | G06K 19/07773 |
| 2018/0018551 A1 * | 1/2018 | Carrier | G06K 19/07722 |
| 2018/0123221 A1 * | 5/2018 | Finn | H01Q 1/2225 |
| 2019/0156073 A1 * | 5/2019 | Finn | G06K 7/10009 |

* cited by examiner

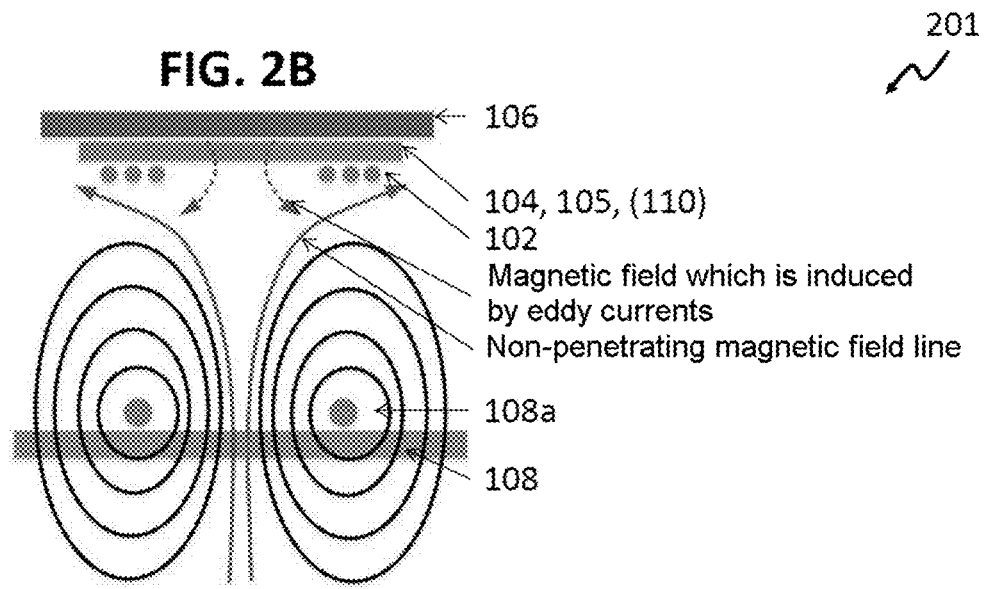
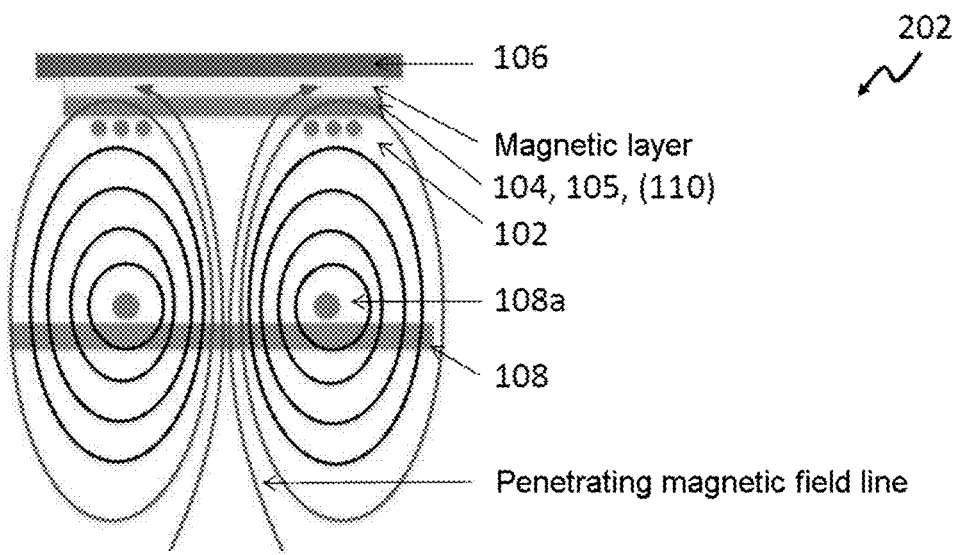

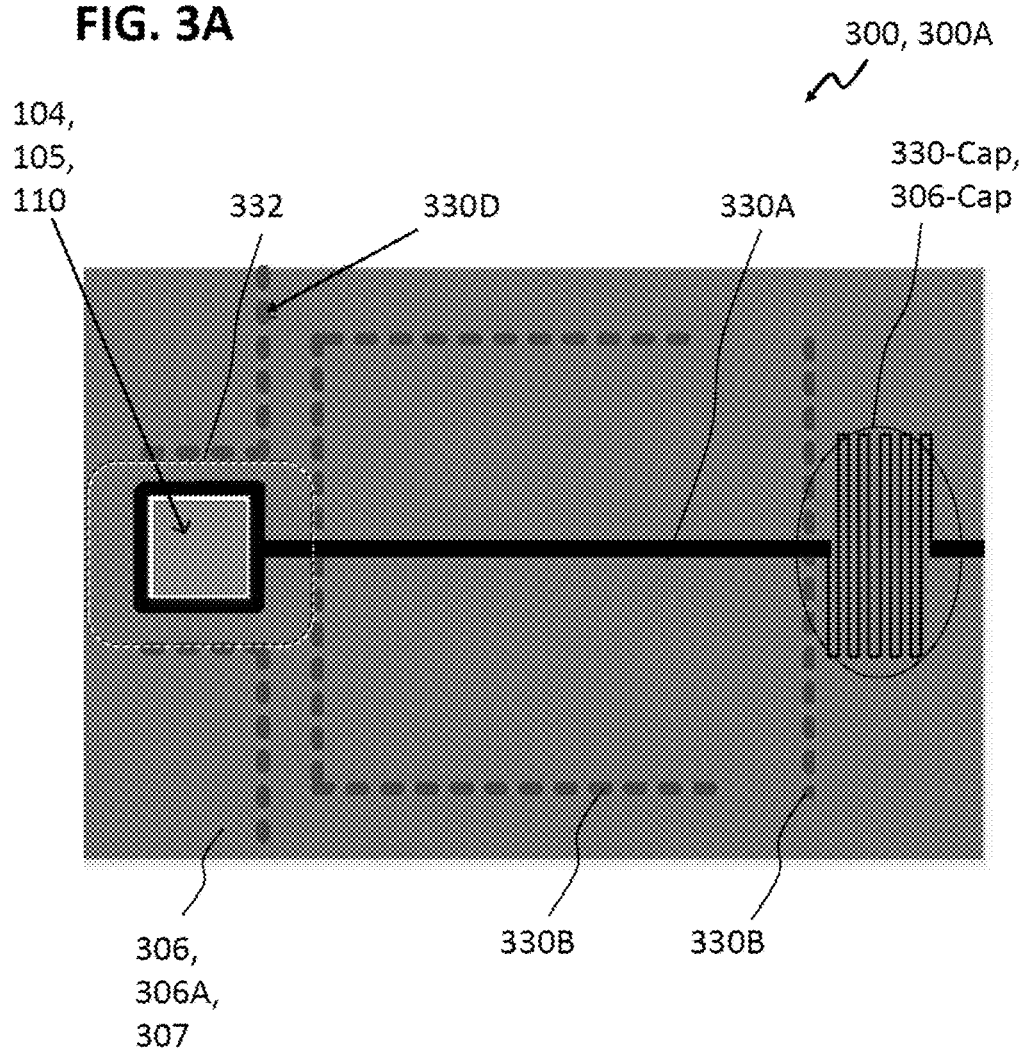

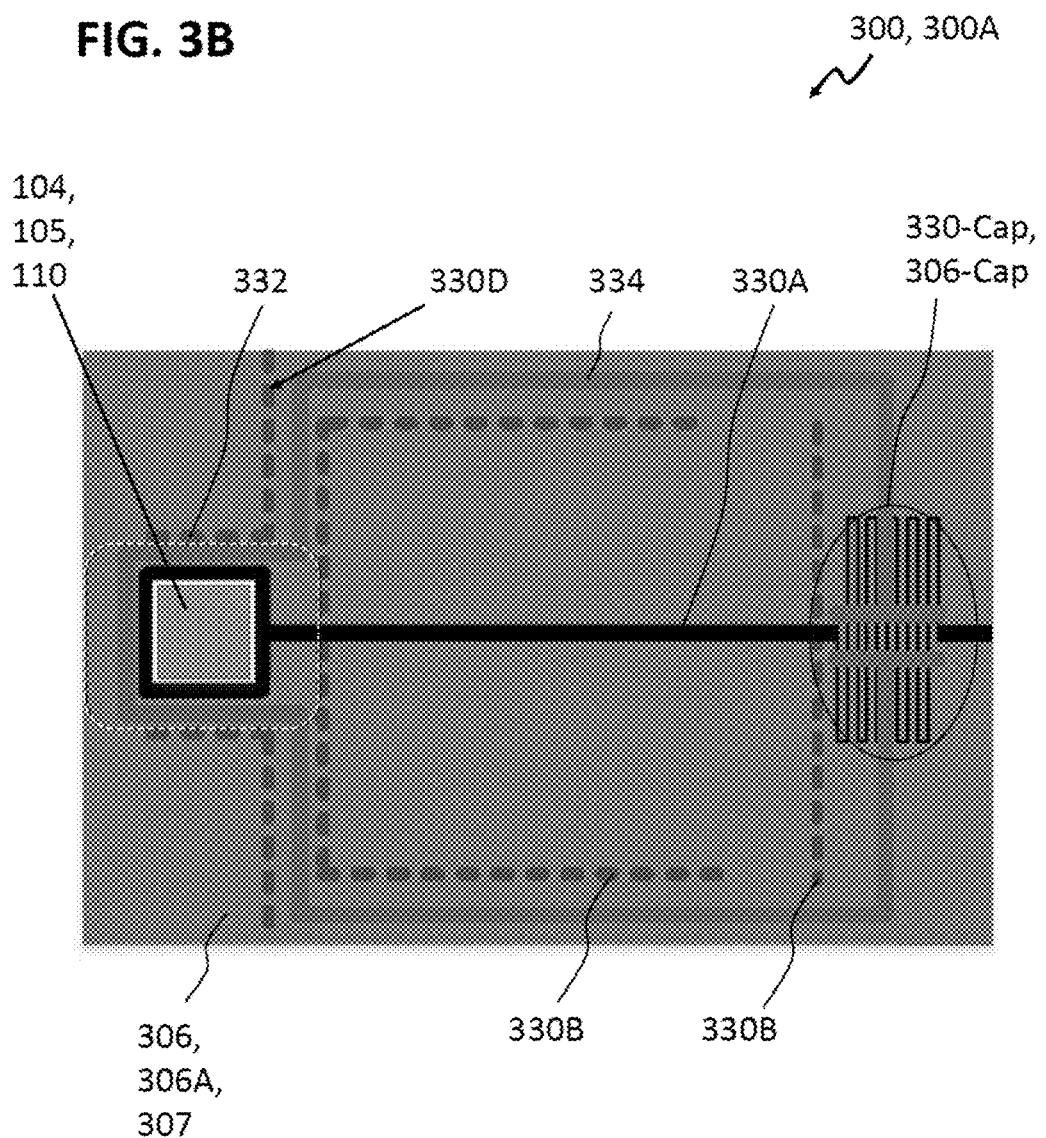

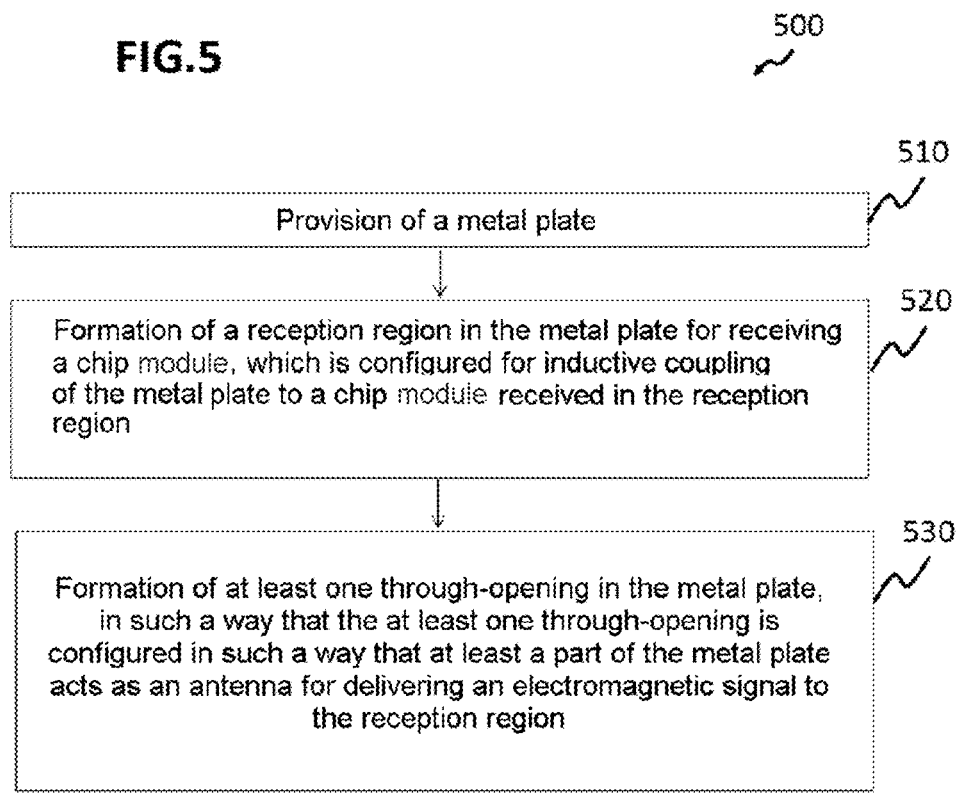

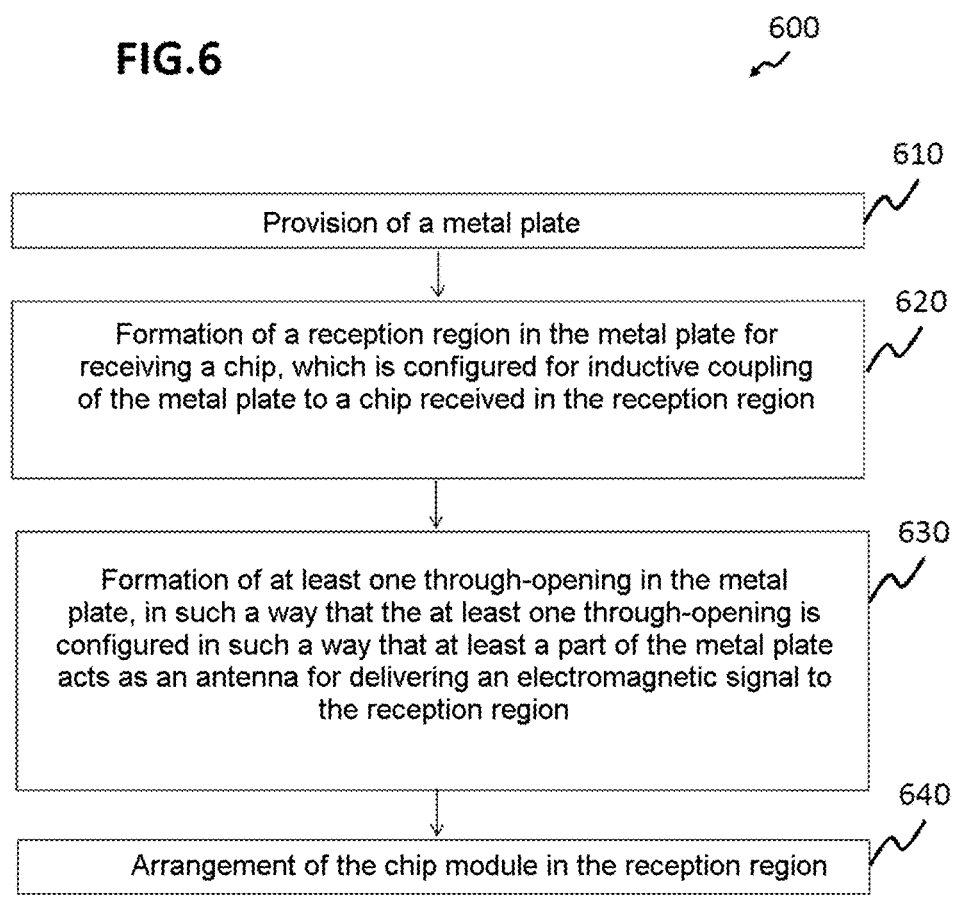

CHIP CARD BODY, CHIP CARD AND METHOD FOR PRODUCING A CHIP CARD BODY

BACKGROUND

Various exemplary embodiments relate to a chip card body, to a chip card and to a method for producing a chip card body.

Credit cards have already been used as payment means for more than half a century, cardboard cards having been used as a form of temporary credit card for the purchasing of products and services before the dissemination of plastic cards.

Recently, plastic cards (FIG. 1A represents a conventional plastic chip card 100 in which the chip module 104 has been removed from its reception opening in the chip card body) have encountered competition from metal credit cards, which are being offered by an increasing number of credit card manufacturers. One of the reasons for this is the so-called "plunk factor", which describes the imposing effect, producible only by metal, which occurs when a metal credit card (with the corresponding noise and metallic gleam) is thrown onto a shop counter. The metal credit card is in this case actually used as a status symbol since metal credit cards were originally offered particularly to wealthy customers. In such cases a noble metal, for example gold or at least a gold coating, as the metal and/or an artistic configuration of the metal card was used, as is represented by way of example for the schematically depicted card in FIG. 2A (upper image). Since then, however, metal credit cards (see, for example, the metal credit card example of FIG. 2A (bottom)) have also been offered to normal customers.

The cards represented in FIG. 2A are currently provided primarily as contact credit cards. This means that data exchange with a chip of the credit card is carried out by means of contacting by contact faces 220 integrated in a chip module, which are configured according to ISO 7816, even if they are possibly configured (as represented in the upper image in FIG. 2A) in such a way that they form a part of an artistic configuration of a card body 106, into which the chip module is inserted.

As an alternative or in addition, contactless data exchange with the chip card chip would be desirable. For contactless data transmission, a corresponding antenna must be connected to the chip card chip. One economical, effective and robust solution for such an antenna is offered for a conventional contactless chip card 100 by so-called coil-on-module technology. This consists essentially of a coil-on-module chip module 104, which comprises a module antenna 110 for inductive coupling to a booster antenna 102 arranged in the chip card body 106 (see FIG. 1A and FIG. 1B). A corresponding functionality is schematically shown in FIG. 1C.

The contactless chip card 100 may have the booster antenna 102 for wireless communication with an external reader 108. The booster antenna 102, as represented in FIG. 1B and FIG. 1C, may have a series resonant circuit which comprises an inductor 102PC, 102Ls1, an (ohmic) resistor (which is for example provided by means of a resistance of the conductive line that forms the antenna), and a capacitor 102Cs. The booster antenna 102 may furthermore have a coupling coil Ls2, 102Ls2 for coupling to the module antenna 110 of the chip module 104. The part of the booster antenna 102 which is used for coupling to the external reader 108 is also referred to as a pickup coil Ls2.

In general, a credit card body made of metal is not very suitable as a body for a contactless credit card with standard antennas laid as a wire because of eddy currents induced in the metal. This is illustrated in FIG. 2A: for example, as represented in FIG. 2B, the credit card body 106 made of metal induces a magnetic field in the opposite direction, which can prevent penetration of magnetic field lines into a magnetic field region of an antenna 102 which is coupled to a chip module 104. Correspondingly, for a chip card read or write device 108 which comprises an antenna 108a, it may be impossible to carry out a read or write process on a chip 105 of the chip module 104.

In the case of antennas 102 according to the prior art, an effect of a metal body 106 is compensated for by means of ferrite, or the antenna 102 is screened from the metal 106 by ferrite. As represented in FIG. 2B (bottom), the ferrite (the "magnetic layer") leads figuratively speaking to "short circuiting" of the magnetic field lines and thereby causes screening against the metal environment. Such a configuration is used for example in smartphones, for example for a region above the battery, or for example in the case of metal tag devices for near-field communication (NFC).

In general, metal environments and metal surfaces are provided so that they induce eddy currents in the metal which have a magnetic field direction that is opposite to the usual magnetic field direction.

Here, devices and methods are provided which make it possible to provide a metal body or a metal surface as a body of a contactless chip card.

FIGURES

Exemplary embodiments of the disclosure are represented in the figures and will be explained in more detail below.

FIG. 2B shows two schematic representations of interactions between a contactless chip card with a metal body and a reader;

Figure 1A:
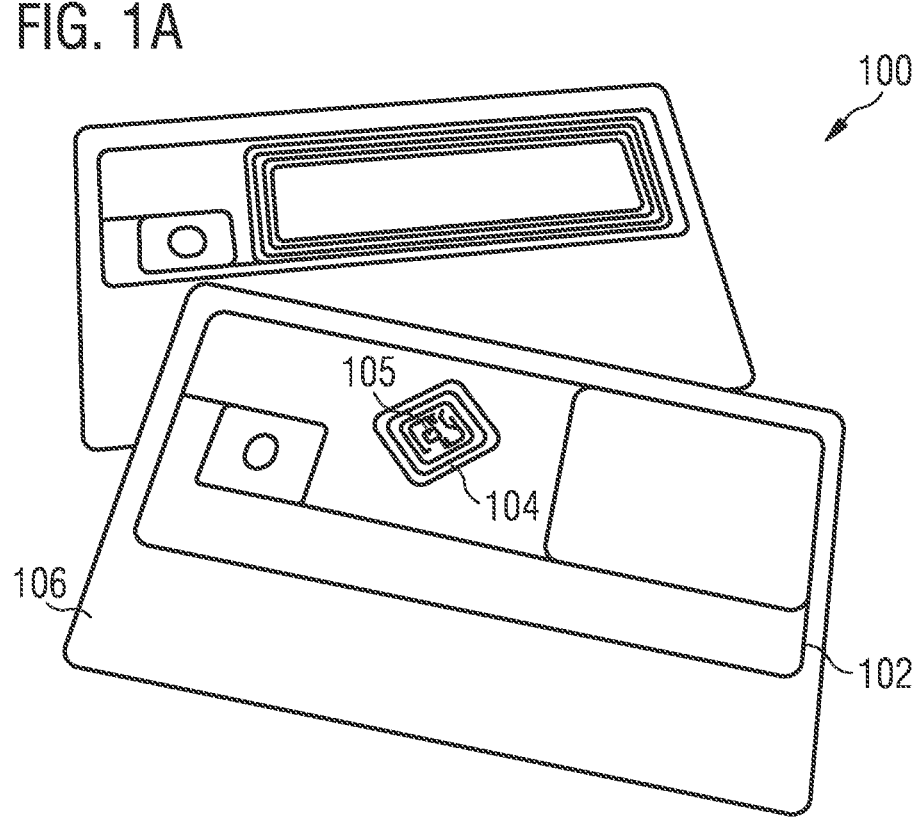
FIG. 1A shows a photograph of two partially disassembled conventional chip cards, which each have a booster antenna and a chip module (CoM)
Figure 1B:
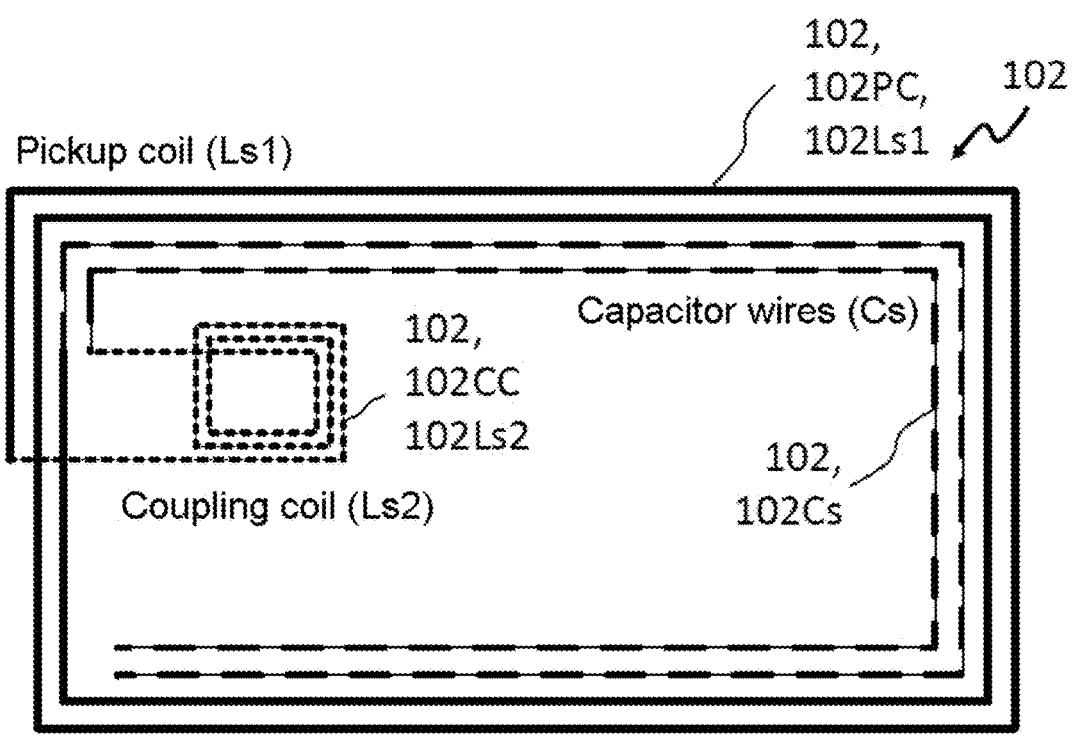
FIG. 1B shows a schematic plan view of a conventional booster antenna.
Figure 1C:
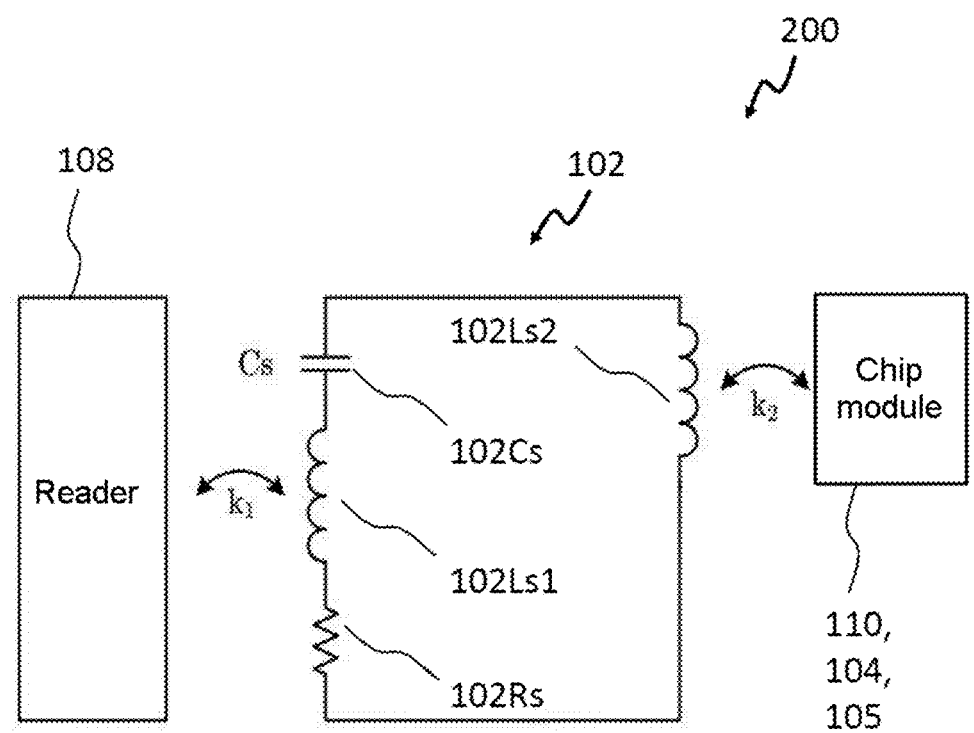
FIG. 1C shows a schematic view of a booster antenna which is coupled contactlessly to a reader and a chip module (CoM)
Figure 2A:
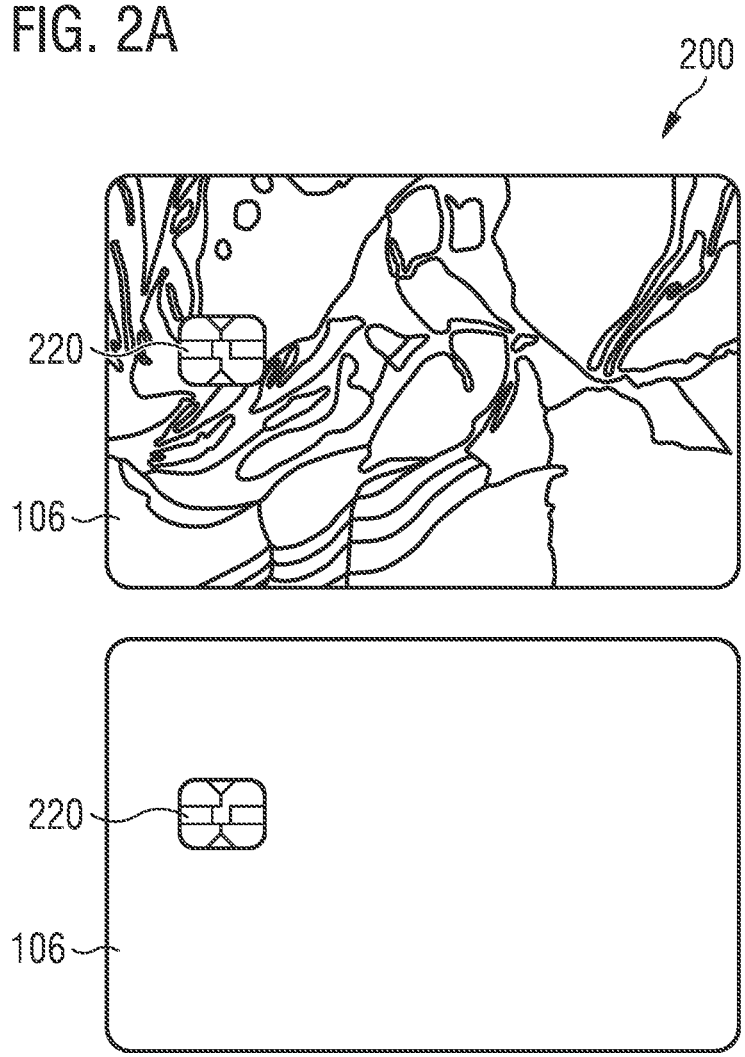
FIG. 2A shows photographs of two metal credit cards according to the prior art, which have contact faces.
Figure 3C:
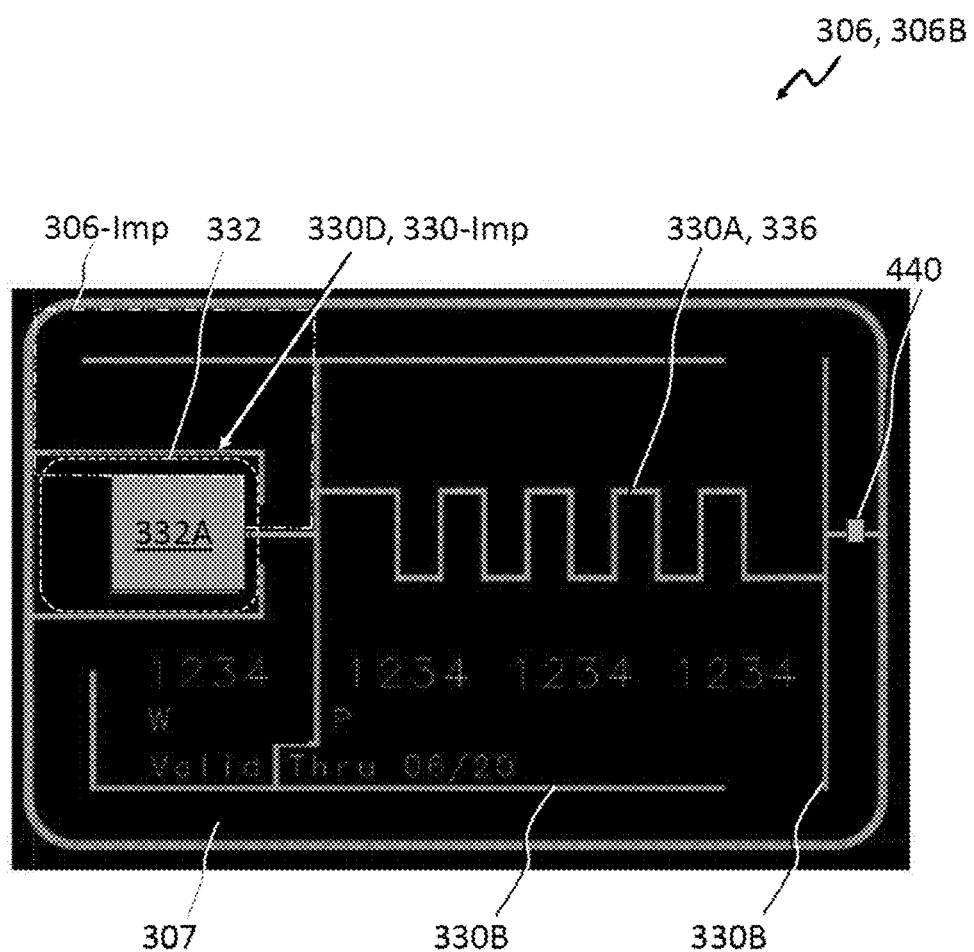
Figure 3D:
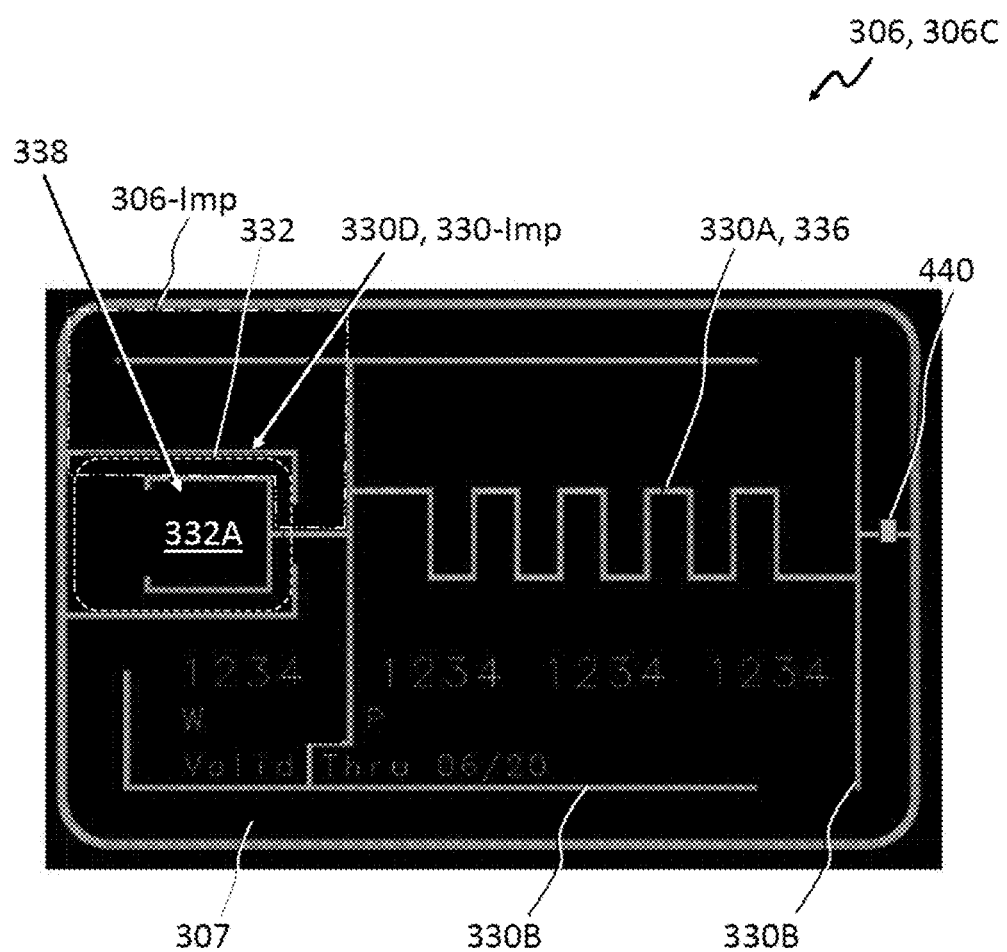
Figure 3E:
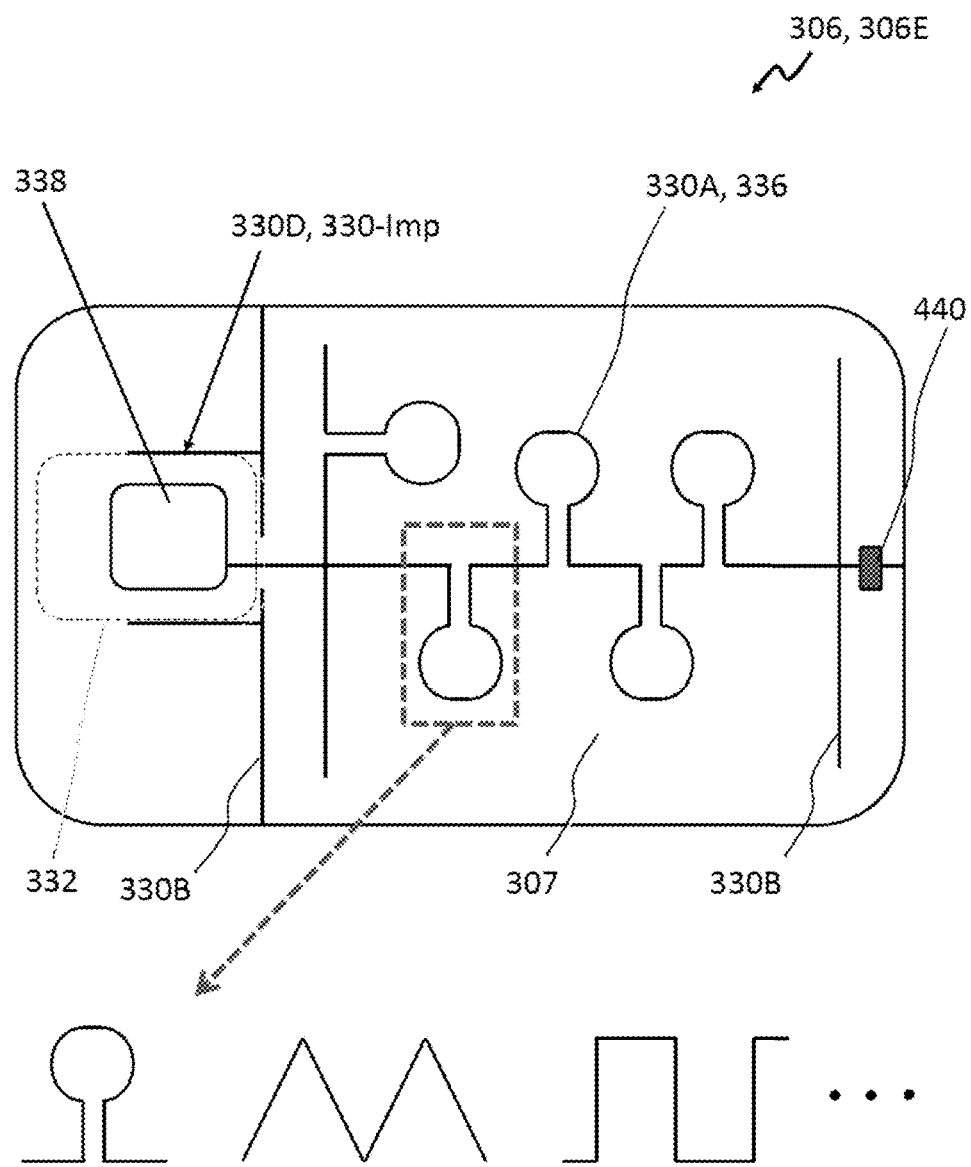
Figure 4:
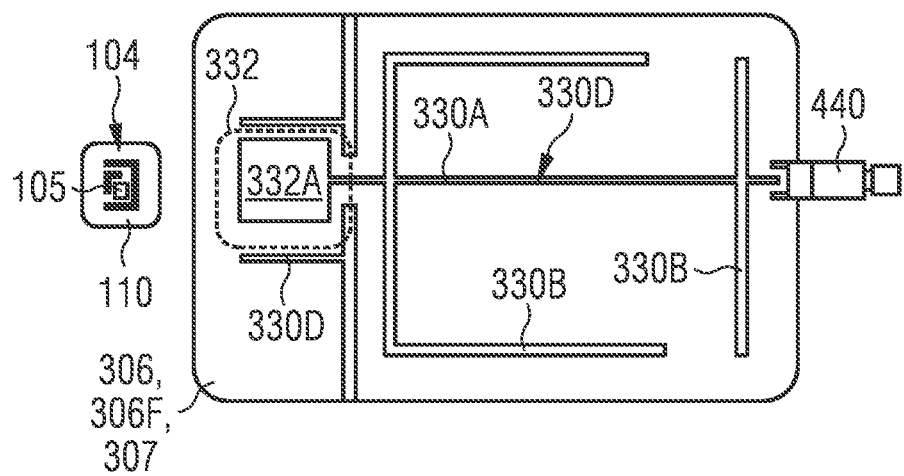
Figure 4:
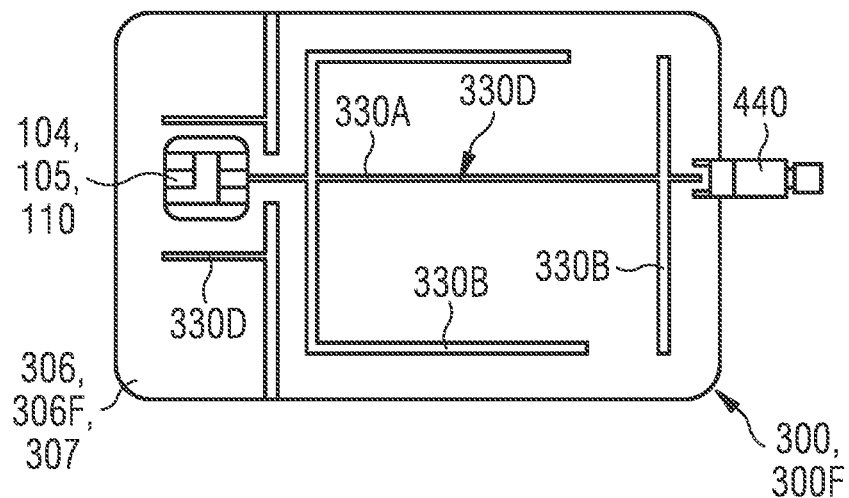

FIGS. 3A and 3B respectively show a schematic plan view of a chip card according to various exemplary embodiments;

FIGS. 3C, 3D and 3E respectively show a schematic plan view of a chip card body according to various exemplary embodiments;

FIG. 4 shows photographs of a prototype of a chip card body, or of a chip card, according to various exemplary embodiments;

FIG. 5 shows a flowchart of a method for forming a chip card body according to various exemplary embodiments; and FIG. 6 shows a flowchart of a method for forming a chip card according to various exemplary embodiments.

DETAILED DESCRIPTION

In the following detailed description, reference is made to the appended drawings, which form part of this description and in which specific embodiments, in which the subject matter of the disclosure may be carried out, are shown for illustration. In this regard, direction terminology such as "up", "down", "forward", "backward", "front", "rear", etc. is used with reference to the orientation of the figure or figures being described. Since component parts of embodiments may be positioned in a number of different orientations, the direction terminology is used for illustration and is in no way restrictive. It is to be understood that other embodiments may be used, and structural or logical variations may be carried out, without departing from the protective scope of the present disclosure. It is to be understood that the features of the various exemplary embodiments described herein may be combined with one another, unless otherwise specifically indicated. The following detailed description is therefore not to be interpreted in a restrictive sense, and the protective scope of the present disclosure is defined by the appended claims.

In the scope of this description, terms such as "connected" or "coupled" are used to describe both direct and indirect connection, and direct or indirect coupling. In the figures, elements which are identical or similar are provided with identical references, insofar as this is expedient.

In the scope of this description, features or devices which are distinct but similar to one another are sometimes differentiated from one another by suffixed letters (for example through-openings 330A, 330B, 330D, 330-Cap). For these, the number without the suffixed letters is then used as a general reference, even if the general reference is not used in the drawings.

Various aspects of the disclosure are provided for devices, and various aspects of the disclosure are provided for methods. It is to be understood that the fundamental properties of the devices also applied for the methods, and vice versa. For the sake of simplicity, repeated description of such properties is sometimes omitted.

As described above, a metal environment significantly reduces a total power of a conventional coil-on-module chip card.

In various exemplary embodiments, a pure metal card (more accurately: a chip card having a pure metal body) is provided, which is capable of communicating with a transmission/reception device by using a CoM module.

In various exemplary embodiments, the metal card makes do without complex structures such as through-contacts (vias) or lines laid in an additional plane. The entire antenna may be configured in such a way that it has only a single turn, which consists of the metal itself.

In various exemplary embodiments, a simple card configuration can be provided without further materials or additional planes.

In contrast to the prior art, in various exemplary embodiments a combination of a card body (also referred to as a card carrier) with a booster antenna can be provided as a single metal structure.

In other words, the card body made of metal may be shaped in such a way that it is suitable for acting as a booster antenna, which comprises a pickup coil Ls1 that is configured to exchange data with an external read/write device 108, and a coupling coil Ls2 for coupling to the module antenna 110 of the chip module 104.

FIG. 3A and FIG. 3B respectively show a schematic plan view of a chip card 300 according to various exemplary embodiments, and FIG. 3C, FIG. 3D and FIG. 3E respectively show a schematic plan view of a chip card body 306 according to various exemplary embodiments. FIG. 4 shows photographs of a prototype of a chip card body 306, or of a chip card 300, according to various exemplary embodiments. The figures (when taken together) illustrate a fundamental concept of the exemplary embodiments.

The chip card body 306 represented in the exemplary embodiments in FIG. 3C to FIG. 3E as well as in FIG. 3A and FIG. 3B as part of the chip cards 300 may comprise, consist of or essentially consist of a metal 307.

The metal 307 may be any metal with suitable load-bearing capacity and suitable electrical conductivity. The metal 307 of the chip card body 306 may comprise a single uniform type of metal, an alloy and/or a layer stack of different metals.

For example, the metal 307 of the chip card body 306 may comprise or consist of gold, steel, iron, silver, platinum, aluminum, copper and/or an alloy of one or more of these metals.

The metal 307 of the chip card body 306 may, in various exemplary embodiments, be configured as a metal plate 307. The metal plate 307 may, in various exemplary embodiments, essentially have the dimensions of the chip card 300. In other words, the chip card body 306 may be configured in such a way that structures which are thick or large in comparison with a thickness of the metal plate 307 are not applied on any surface of the metal 307, but merely an encapsulation layer or the like is applied.

The chip card body 106 may, in various exemplary embodiments, be formed essentially by the metal plate 307.

In various exemplary embodiments, a reception region 332 for receiving a chip module (with a chip 105) may be formed in the metal plate 307, which region is configured for inductive coupling of the metal plate 307 to a chip module 104 received in the reception region 332.

For coupling of the chip 105 and its chip module 104 to the reception region 307, the chip may be electrically conductively connected to a coupling coil 110. The chip 105 and the coupling coil 110 may be part of the chip module 104, which may furthermore also comprise a chip module body. The chip 105 and the coupling coil 110 may be arranged in an essentially known way on or in the chip module body as a CoM chip module 104.

The chip card body 306 may furthermore comprise at least one through-opening 330A in the metal plate 307, the through-opening being configured in such a way that at least a part of the metal plate 307 acts as an antenna for delivering an electromagnetic signal to the reception region 332. A through-opening 330A in the metal plate 307 is intended to mean an opening which extends from one main face of the metal plate 307 as far as the opposite main face of the metal plate 307.

The at least one through-opening 330 may, in various exemplary embodiments, comprise a multiplicity of through-openings 330A, 330B, 330D, 330-Cap. The at least one through-opening 330 is represented in FIGS. 3A to 3E as a black, gray, white or light-blue line.

The at least one through-opening 330 may, in various exemplary embodiments, be configured in such a way that the metal face is subdivided into regions which form functional elements of the (booster) antenna. In other words, it may be necessary to arrange the through-openings 330 in the chip card body in order to form the booster antenna structure. Additional through-openings 330 may be provided in order to increase the total power of the booster antenna system.

The at least one through-opening 330 may be formed in the metal plate 307 as at least one slit 330 in the metal plate 307.

The at least one slit 330 may in this case comprise a plurality of slits 330. The at least one slit may have a slit width in a range of from approximately 10 µm to approximately 1 mm, for example from about 50 µm to about 500 µm, for example from about 100 µm to about 300 µm.

The booster antenna inductor is thus produced by the through-openings 330, i.e. the separation/subdivision of the metal chip card body 306. The so-called skin effect is responsible for a current at high frequencies flowing primarily on the outer face of a conductor. Correspondingly the inductor of the present metal card coil may be compared with a single large coil winding of class 1. The inductors may, however, be modified and formed with additional through-openings 330.

For example, a first through-opening 330A may extend essentially parallel to mutually opposite edges (for example long edges) of the chip card body 306, as represented in FIG. 3A to FIG. 3E, or, for example, be arranged offset with respect to the (longitudinal) middle axis, as is the case in the chip card bodies 306B and 306C from FIG. 3C and FIG. 3D. The first through-opening 330A may be arranged approximately on the longitudinal midaxis, as is the case for example in the chip card 300A of FIG. 3A and FIG. 3B and the chip card 300F of FIG. 4 and in the chip card body 306E of FIG. 3E, or, for example, be arranged offset with respect to the (longitudinal) middle axis, as is the case in the chip card bodies 306B and 306C from FIG. 3C and FIG. 3D. The first through-opening may, in various exemplary embodiments, extend as far as an edge of the chip card body 306 which is different than the opposite edges (for example a transverse edge), so that, by the resulting subdivision of the chip card body 306, two antenna leaves are formed which extend from the reception region 332 (which is also referred to as the chip card module coupling region 332 or for brevity simply as the coupling region 332) to that edge of the chip card body 306 which is subdivided by the through-opening 330. In other exemplary embodiments, the long and transverse edges may be interchanged.

Furthermore, one or more of the through-openings 330 may be formed as conductive through-opening(s) 330B. The conductive through-opening(s) 330B may be configured (for example as slits) and arranged in such a way that there is a path that is as long as possible, or a relatively long path, which furthermore fulfills further specifications of the antenna, for charge movements which may occur when delivering an electromagnetic signal to the reception region 332 (or equally when conducting an electromagnetic signal away out of the reception region 332).

Furthermore, one or more of the through-openings 330 may be formed as through-opening(s) 330D defining the reception region 332. The through-opening(s) 330D defining the reception region 332 may be configured (for example as slits) and arranged in such a way that, when being moved, the charge is guided around a part of the reception region 332 which is intended for receiving the chip module 104. In this way, it is possible to form a coupling coil (with a single, optionally incomplete turn), which is suitable for coupling inductively to the module antenna 110 of the chip module 104.

The coupling between the coupling coil formed by the metal of the reception region 332 and the module antenna 110 may be commensurately more intense when the distance between the coupling coil and the module antenna 110 is smaller.

Correspondingly, the through-opening(s) 330D defining the reception region 332 may be configured and arranged in such a way that they set the small distance between the coupling coil and the module antenna 110. For example, as represented in FIG. 3A to FIG. 3E, at least parts of the through-opening(s) 330D defining the reception region 332 may extend along the edges of the chip card module 104 which is to be inserted, or which has already been inserted, specifically at a distance which is less than a maximum width of the chip card module 104, for example less than half the maximum width, for example less than one fourth of the maximum width.

In various exemplary embodiments, the chip card body may furthermore comprise a capacitor, which is coupled to the metal plate 307.

The capacitor may, as represented in FIG. 4, be a capacitor 440 which is not part of the metal plate 307 but is electrically conductively connected to the metal plate 307. The capacitor 440 represented in FIG. 4 was merely used for testing the functional capability of the chip card 300E in the prototype. In a case in which the additional capacitor 440, which is not part of the metal plate 307, is used for a chip card 300E to be given to a user, a capacitor 440 would be used whose overall size makes it possible for it to be integrated inconspicuously into the chip card 300E.

In various exemplary embodiments, the capacitor may be integrated monolithically in the metal plate.

Furthermore, as represented in FIG. 3A and FIG. 3B, one or more of the through-openings 330, or subregions thereof, may be formed as capacitor through-openings or capacitance through-opening(s) 330-Cap. The capacitance through-opening(s) 330-Cap may be configured in such a way (for example as a meandering slit) that a resulting comb-like structure 306-Cap of the metal plate 307 acts as a capacitor. By means of adapting the number, distance, width and length of the meanderingly shaped through-opening(s) 330-Cap, or the thereby established number, distance, width and length of the metal capacitor elements contactlessly engaging in one another in a comb-like fashion, the capacitance of the capacitor can be adapted and tuning of the metal plate 307 acting as a booster antenna can thus be carried out. In that case, the capacitor may therefore be integrated monolithically into the metal plate 307.

The capacitor (irrespective of whether it is the additional capacitor or the capacitor formed as part of the metal chip card body) may, in various exemplary embodiments, have a capacitance in a range of from approximately 800 pF to approximately 3 nF, example from about 1 nF to 2 nF, for example from about 1.3 nF to about 1.7 nF.

The chip card body 306 may furthermore have an electromagnetic adaptation structure 330-Imp for forming a target electromagnetic impedance. In this case, the electromagnetic adaptation structure may be monolithically integrated in the metal plate 307.

By way of example, FIG. 3C and FIG. 3D respectively represent an electromagnetic adaptation structure in the form of an impedance. One or more of the through-openings 330, or subregions thereof, may be formed as impedance through-opening(s) 330-Imp. The impedance through-opening(s) 330-Imp may be configured and arranged in such a way that a structure 306-Imp thereby formed, for example winding in a meandering shape, of the metal plate 307 acts as an impedance structure. The impedance through-opening(s) 330-Imp may dictate the number, distance, width and length of the impedance structure (for example the meandering structure) 306-Imp formed by them, in such a way that a desired impedance is achieved and tuning of the metal plate 307 acting as a booster antenna is therefore carried out. In this case, the impedance 306-Imp may therefore be monolithically integrated into the metal plate 307.

In various exemplary embodiments, the through-openings, as represented for example in FIG. 3C, FIG. 3D and FIG. 3E, may be configured in such a way that a mechanical robustness of the metal chip card body 306 is affected as little as possible.

For example, instead of a single straight slit 330A, which approximately halves the entire chip card body 306 lengthwise as in FIG. 3A, FIG. 3B and FIG. 4, the through-opening 330A may be formed as a meandering structure. Other shapes of through-openings (for example slits) which entail a minor loss of mechanical stability are jigsaw-like structures (with mushroom head-like projections which are received in correspondingly shaped openings) and similar structures, a plurality of examples of which are schematically represented in FIG. 3E.

With such a configuration, it may be necessary to comply with a minimum distance between meander structures in order to minimize (undesired) capacitive effects.

It is to be understood that the individual structures (impedance structure 306-Imp, capacitor structure 306-Cap, etc.) may be applied in combination in the configuration of a chip card body 300 according to various exemplary embodiments.

Furthermore, it is to be understood that each of the chip card bodies 306 of the various exemplary embodiments is configured in such a way that it may be converted into a chip card 300 according to various exemplary embodiments by means of arranging a chip 105 (for example as part of a CoM module 104) in the reception region, and vice versa each of the chip cards 300 according to various exemplary embodiments comprises a chip card body 306 according to various exemplary embodiments.

The metal chip card prototype of FIG. 4 is capable of operating with Hmin=0.7 A/m.

In order to reduce the so-called "loading effect", it may be necessary to add more through-openings (for example slits) 330. The "loading effect" refers to a physical effect and all influences and repercussions (regardless of whether they are static or pseudostatic) of the load (in all its forms) which the target of near-field communication (NFC), in this case the chip card 300, exerts on unperturbed operation of the reader 108 by its very presence.

In various exemplary embodiments, the through-openings 330 may be arranged mirror-symmetrically, for example with respect to a longitudinal axis and/or with respect to one of the through-openings, as represented for example in FIG. 3A, FIG. 3B and FIG. 4. In other exemplary embodiments, as is shown for example in FIG. 3C and FIG. 3D, the through-openings 330 may be arranged asymmetrically in the metal plate 307.

In various exemplary embodiments, the through-openings 330 or additional through-openings (not represented), which do not influence the antenna function or influence it only insubstantially, may be arranged in the chip card body 306 and configured in such a way that, for example, they form a logo.

In various exemplary embodiments, the at least one through-opening 330 may be or become filled with a non-galvanic material, for example an electrically insulating material, for example an electrically insulating adhesive.

The electrically insulating material may be used, in order to improve handleability of the chip card 300, to protect the chip card 300 from damage.

The electrically insulating material may furthermore be used in order to arrange the chip 105, for example as part of the chip module 104, in the reception region 332. In other words, the chip 105 may be mechanically coupled to the chip card body 306, for example the metal plate 307, by means of the electrically insulating material.

The reception region 332 may comprise a reception opening 332A for receiving the chip (for example the chip module 104). The chip 105 (for example the chip module 104) may be or become mechanically coupled to the metal plate 307.

The reception opening 332A may, as represented in FIG. 3C and FIG. 4, be formed as a through-opening. In that case, the chip module 104 may for example be adhesively bonded, cast or laminated into the reception opening 332A, or latched therein by means of a latching structure configured in a mutually corresponding way in the chip module 104 and the chip card body 306.

In various exemplary embodiments, the reception opening 332A may be configured in such a way that the metal chip card body 306 is slightly thinned, but not entirely removed, in the region of the reception opening 332A, so that, as represented in FIG. 3D, a mounting region 338 is provided for arranging the chip 105 (for example the chip module 104) in the reception opening 332A. Mounting of the chip module 104 can therefore be simplified, because the chip module 104 may for example be adhesively bonded directly to the mounting region 338 or positioned thereon before casting.

Lamination of the chip card 300 may in various exemplary embodiments increase a mechanical stability of the chip card 300, in particular for flexural loads. Furthermore, a possibility is provided for configuring the chip card 300 by printing.

In various exemplary embodiments, the chip card 300 may, in addition to the contactless functionality, comprise contact faces so that it can also be used by means of a reader which is configured for a contact read/write function (such a chip card is also referred to as a dual-mode chip card). By way of example, the chip module 104 in FIG. 4 shows corresponding conventional contact faces.

FIG. 5 shows a flowchart 500 of a method for forming a chip card body according to various exemplary embodiments.

The method may comprise: provision of a metal plate (at 510), formation of a reception region in the metal plate for receiving a chip, which is configured for inductive coupling of the metal plate to a chip received in the reception region (at 520), and formation of at least one through-opening in the metal plate, in such a way that the at least one through-opening is configured in such a way that at least a part of the metal plate acts as an antenna for delivering an electromagnetic signal to the reception region (at 530).

The chip may be arranged in the reception region as part of a chip module. The chip module may furthermore comprise a module antenna for inductive coupling to the metal plate.

The formation of the at least one through-opening may, in various exemplary embodiments, be carried out by means of a laser, for example by means of laser cutting.

Formation of a reception opening for receiving the chip, for example as described above, may also be carried out by means of the laser, even in a case in which the reception opening is not formed as a through-opening, by means of restricting a cutting depth of the laser.

FIG. 6 shows a flowchart 600 of a method for forming a chip card according to various exemplary embodiments.

The method may comprise: provision of a metal plate (at 610), formation of a reception region in the metal plate for receiving a chip, which is configured for inductive coupling of the metal plate to a chip received in the reception region (at 620), formation of at least one through-opening in the metal plate, in such a way that the at least one through-opening is configured in such a way that at least a part of the metal plate acts as an antenna for delivering an electromagnetic signal to the reception region (at 630), and arrangement of the chip in the reception region (at 640).

In order to arrange the chip in the reception region, for example, a chip module which comprises the chip may be arranged in, for example adhesively bonded, cast or laminated in, a reception opening, or latched therein by means of a latching structure configured in a mutually corresponding way in the chip module and the chip card body. In various exemplary embodiments, the methods for arrangement of the chip may be combined, and for example the chip may be adhesively bonded and also laminated in together with the rest of the chip card.

Exemplary embodiment 1 provides a chip card body. The chip card body may comprise a metal plate, a reception region in the metal plate for receiving a chip, which is configured for inductive coupling of the metal plate to a chip received in the reception region (for example as part of a chip module which furthermore comprises a module antenna connected to the chip), and at least one through-opening in the metal plate, which is configured in such a way that at least a part of the metal plate acts as an antenna for delivering an electromagnetic signal to the reception region.

Exemplary embodiment 2 is a chip card body according to exemplary embodiment 1, wherein the chip card body furthermore comprises a capacitor which is coupled to the metal plate.

Exemplary embodiment 3 is a chip card body according to exemplary embodiment 2, wherein the capacitor is monolithically integrated in the metal plate.

Exemplary embodiment 4 is a chip card body according to exemplary embodiment 2 or 3, wherein the capacitor has a capacitance in a range of from approximately 800 pF to approximately 3 nF.

Exemplary embodiment 5 is a chip card body according to one of exemplary embodiments 1 to 4, wherein the at least one through-opening in the metal plate is configured as at least one slit in the metal plate.

Exemplary embodiment 6 is a chip card body according to exemplary embodiment 5, wherein the at least one slit comprises a plurality of slits.

Exemplary embodiment 7 is a chip card body according to one of exemplary embodiments 5 and 6, wherein the at least one slit has a slit width in a range of from approximately 10 µm to approximately 1 mm.

Exemplary embodiment 8 is a chip card body according to one of exemplary embodiments 1 to 7, wherein the chip card body furthermore comprises an electromagnetic adaptation structure for forming a target electromagnetic impedance.

Exemplary embodiment 9 is a chip card body according to exemplary embodiment 8, wherein the electromagnetic adaptation structure is monolithically integrated in the metal plate.

Exemplary embodiment 10 is a chip card body according to one of exemplary embodiments 1 to 9, wherein the chip card body is essentially formed by the metal plate.

Exemplary embodiment 11 is a chip card body according to one of exemplary embodiments 1 to 10, wherein the at least one through-opening is filled with an electrically insulating material.

Exemplary embodiment 12 provides a chip card which comprises a chip card body according to one of exemplary embodiments 1 to 11.

Exemplary embodiment 13 is a chip card according to exemplary embodiment 12, wherein a chip is provided in the reception region and is mechanically coupled to the metal plate.

Exemplary embodiment 14 is a chip card according to exemplary embodiment 13, wherein the chip is mechanically coupled to the metal plate by means of an electrically insulating material.

Exemplary embodiment 15 provides a method for producing a chip card body, wherein the method comprises provision of a metal plate, formation of a reception region in the metal plate for receiving a chip, which is configured for inductive coupling of the metal plate to a chip received in the reception region (for example as part of a chip module which furthermore comprises a module antenna connected to the chip), and formation of at least one through-opening in the metal plate, in such a way that the at least one through-opening is configured in such a way that at least a part of the metal plate acts as an antenna for delivering an electromagnetic signal to the reception region.

Exemplary embodiment 16 is a method according to exemplary embodiment 15, wherein the at least one through-opening is formed in the metal plate by means of a laser.

The invention claimed is:

1. A chip card body, comprising:
   a metal plate;
   a capacitor monolithically integrated in the metal plate;
   a reception region in the metal plate for receiving a chip and configured for inductive coupling of the metal plate to a chip received in the reception region; and
   at least one through-opening in the metal plate configured such that at least a part of the metal plate acts as an antenna for delivering an electromagnetic signal to the reception region.

2. The chip card body as claimed in claim 1, wherein the capacitor has a capacitance in a range of from approximately 800 pF to approximately 3 nF.

3. The chip card body as claimed in claim 1, wherein the at least one through-opening in the metal plate is configured as at least one slit in the metal plate.

4. The chip card body as claimed in claim 3, wherein the at least one slit has a slit width in a range of from approximately 10 µm to approximately 1 mm.

5. The chip card body as claimed in claim 1, further comprising:
   an electromagnetic adaptation structure configured to form a target electromagnetic impedance.

6. The chip card body as claimed in claim 5, wherein the electromagnetic adaptation structure is monolithically integrated in the metal plate.

7. The chip card body as claimed in claim 1, wherein the chip card body is essentially formed by the metal plate.

8. The chip card body as claimed in claim 1, wherein the at least one through-opening is filled with an electrically insulating material.

9. A chip card, comprising:
   a chip card body as claimed in claim 1.

10. The chip card as claimed in claim 9, further comprising:
    a chip provided in the reception region and mechanically coupled to the metal plate.

11. The chip card as claimed in claim 10, further comprising:
    an electrically insulating material mechanically coupling the chip to the metal plate.

12. The chip card body as claimed in claim 1, wherein the monolithically integrated capacitor is formed from the at least one through-opening.

13. The chip card body as claimed in claim 12, wherein the at least one through-opening is a meandering slit having a comb-like structure.

14. A chip card body, comprising:
  a metal plate;
  a reception region in the metal plate for receiving a chip and configured for inductive coupling of the metal plate to a chip received in the reception region; and
  a plurality of slits in a same layer of the metal plate and configured such that at least a part of the metal plate acts as an antenna for delivering an electromagnetic signal to the reception region.

15. A method for producing a chip card body, the method comprising:
  providing a metal plate;
  forming in the metal plate a monolithically integrated capacitor;
  forming in the metal plate a reception region for receiving a chip and configured for inductive coupling of the metal plate to a chip received in the reception region;
  forming in the metal plate at least one through-opening configured such that at least a part of the metal plate acts as an antenna for delivering an electromagnetic signal to the reception region.

16. The method as claimed in claim 15, wherein the at least one through-opening is formed in the metal plate by means of a laser.

17. The method as claimed in claim 15, further comprising:
  forming the monolithically integrated capacitor from the at least one through-opening.

18. The method as claimed in claim 17, further comprising:
  forming the at least one through-opening as a meandering slit having a comb-like structure.

* * * * *